United States Patent [19]
Rohde et al.

[11] 3,791,928
[45] Feb. 12, 1974

[54] PURIFICATION OF THYMIDINE KINASE
[75] Inventors: Wolfgang Rohde, Bovenden; Axel Lezius, Gottingen, both of Germany
[73] Assignee: Max-Planck-Gesellschaft Zur Forderung Der Wissenschaften e.V., Gottingen, Germany
[22] Filed: May 28, 1971
[21] Appl. No.: 148,189

[30] Foreign Application Priority Data
June 10, 1970 Germany............................ 2028588

[52] U.S. Cl............ 195/66 R, 195/68, 195/DIG. 11
[51] Int. Cl.............................................. C07g 7/02
[58] Field of Search.......................... 195/66, 68, 63

[56] References Cited
UNITED STATES PATENTS
3,208,918  9/1965  Beers, Jr. ........................ 195/66 R
3,645,852  2/1972  Axen et al. .......................... 195/68

OTHER PUBLICATIONS

Okazaki et al., "Deoxythymidine Kinase of Escherichia coli," Journal of Biological Chemistry, Vol. 239, No. 1, 1964 (pp. 269–284) Qp501J7.

*Primary Examiner*—David M. Naff

[57] ABSTRACT

Purified thymidine kinase is recovered from its contaminated aqueous solutions by adsorption on cross-linked dextran of chromatographic grade activated with bromine cyanide and coupled with 3'- or 5'-aminothymidine or its N-aminoalkyl derivatives, followed by elution with dilute sodium chloride solution at pH 8.

6 Claims, No Drawings

PURIFICATION OF THYMIDINE KINASE

The present invention is concerned with a new process for obtaining thymidine kinase from aqueous solutions, especially from solutions which are contaminated with other proteins.

Thymidine kinase is an enzyme which is widely distributed in the animal and vegetable kingdoms and can be obtained from the solutions obtained by the digestion of cellular material. According to a known process, thymidine kinase is obtained from *Escherichia coli* by digestion at pH 7, a heating step at 70° to 72°C., Streptomycin precipitation, two ammonium sulphate fractionations and chromatography over DEAE-cellulose (R. Okazaki and A. Kornberg in J. Biol. Chem., 239, (1964), p. 269, et seq.). The disadvantage of this process consists in that it is comparatively laborious and only gives yields of about 7 percent.

A process has now been found which, in an extremely simple manner, enables, in a single step, the enrichment and purification of thymidine kinase with yields of over 90 percent.

The process according to the invention for the purification or recovery of thymidine kinase consists in that a thymidine kinase-containing aqueous solution is treated with a cross-linked polymer or gel which contains bound 5'- or 3'-amino-thymidine or N-mono-(ω-amino-alkyl) derivative thereof, the polymer or gel is separated from the solution and the thymidine kinase eluted.

The invention is based upon the surprisingly found fact that 3'-amino-thymdine and 5'-amino-thymidine, as well as their derivatives monosubstituted on the amino nitrogen by an ω-amino- alkyl group, at comparatively high concentrations of $10^{-2}M$, exert a mild inhibiting action for thymidine kinase. Further investigation showed that a polymer or gel combined with these compounds and having a porous structure, was able practically quantitatively and selectively to hold back thymidine kinase from aqueous solutions thereof. A commercially available cross-linked dextran for chromatographic purposes has hereby proved to be especially useful.

The preparation of the substituted dextran preferred for the process of the invention takes place in a manner known per se for reactions of this type by activation of the dextran with cyanobromide and subsequent coupling of the activated dextran with the above-mentioned amino-thymidine.

For the carrying out of the process according to the invention, there are suitable, in principle, all aqueous solutions which contain thymidine kinase, with the proviso that no materials are present therein which are capable of reacting with the gel or polymer. The process according to the invention is especially suitable for the recovery and purification of thymidine kinase from the solutions obtained by the digestion of animal and vegetable, especially of microbiological, starting material. The process according to the invention is also suitable for incorporation at any desired point into processes for the obtaining of other proteins since other enzyme activities are hereby not impaired.

Since *Escherichia coli* represents an especially suitable starting material for the obtaining of thymidine kinase, there is preferably used a solution obtained by digestion of *E. coli*. However, other starting materials can also be used for obtaining it or synthetically prepared solutions can be employed.

If solutions obtained by digestion of *E. coli* are used, it is expedient first to carry out a streptomycin precipitation. If value is placed upon the obtaining of other enzyme activities present in the solution, a further purification can additionally also take place by a heating step at about 70°C. Such a heating step has the advantage that the binding capacity of the gel or polymer is hereby increased.

The selective adsorption of the thymidine kinase depends not only upon the salt concentration of the solution but also upon other process variables, especially upon the pre-treatment of the substituted dextran. A complete binding of the thymidine kinase is generally achieved when the solution has a salt concentration of less than 0.1M. In order to exclude a damaging of the activity of the enzyme, the process is carried out at a neutral or weakly basic pH value, preferably between pH 7 and 8.5. The salt concentration permissible in any particular case can be ascertained in an extremely simple manner in that, after the addition of the dextran to the solution, the residual activity in the supernatant is determined and further water possibly added thereto.

After the adsorption on of the thymidine kinase, the substituted dextran is expediently washed. For this purpose, there are especially suitable salt solutions with a concentration between about 0.1 and 0.25 M. However, under certain circumstances, substantially higher salt concentrations can also be used for the washing, for example, in the case of the use of a dextran column, which has been equilibrated with dilute triethanolamine acetate buffer of pH 7.5. In this case, foreign protein can still be washed out with 1M salt solutions, for example those of sodium acetate, without impairment of the enzyme activity.

The recovery of the bound thymidine kinase (within the scope of the invention, there is hereby understood not only thymidine kinase but also desoxythymidine kinase) takes place by elution of the dextran with higher salt concentrations, expediently with salt concentrations of at least 0.3M. A 0.4 to 1.0M, especially 0.5M, NaCl solution of pH 7 to 9, especially of pH 8, has proved to be especially suitable.

The bringing together of the aqueous solution of thymidine kinase with the substituted dextran can take place in any desired manner. Expediently, either the dextran is stirred with the solution and then filtered off or the solution is filtered over the dextran. In the latter case, it is preferable to operate in the manner of a column chromatography.

The process according to the invention enables, with yields of 90 percent and above, an enrichment of the thymidine kinase in a single step up to 1,000 fold. Quite apart from these high yields and the extraordinary purification action, the process is characterised also by its general applicability, as well as by the simple preparation of the substituted dextran and the good stability thereof, which permits a repeated use without loss of capacity.

The following Examples further illustrate the process of the invention.

A PREPARATION OF THE SUBSTITUTED DEXTRAN

Commercially available cross-linked dextran of chromatographic quality (Sepharose 4B) is pasted with water and then mixed with 100 mg. cyanobromide/ml. dextran, dissolved in the same volume of water. The pH value is adjusted to about 11 by the addition of sodium hydroxide solution immediately and after about 8 minutes, the aqueous solution is filtered off with suction and the dextran washed with dilute sodium bicarbonate solution.

950 ml. of the pretreated Sepharose are mixed in 0.1M phosphate buffer of pH 9 with 1.3 g. 5'-aminothymidine. The product thus obtained can be used directly.

B. CARRYING OUT OF THE PROCESS OF THE INVENTION

*E. coli* are digested in per se known manner in 0.05M glycyl-glycine buffer of pH 7 by shaking up with glass balls and centrifuging. The centrifuge supernatant is mixed with about 0.2 volumes of 5 percent streptomycin sulphate solution and the precipitate formed is centrifuged off. The supernatant is heated to 70° to 72°C. for 5 minutes and centrifuged off from insolubles.

14.7 litres of a solution obtained in this way, with a protein content of 8.9 mg./ml. and a specific activity of 0.0201 U/mg., are subsequently applied to a column which is filled with the substituted dextran described under A. The column is washed with tris buffer of pH 8 of ionic strength 0.01 and then eluted with 0.02M tris buffer of pH 8.0/0.5M NaCl. Table I shews the results.

TABLE I

| | volume ml. | units per ml. | Σ units | protein mg/ml | spec. act. U/mg. | enrichment | yield |
|---|---|---|---|---|---|---|---|
| starting solution | 14700 | 0.184 | 2700 | 8.9 | 0.0201 | | |
| elute | 1790 | 1.34 | 2400 | 0.32 | 4.2 | 204 fold | 89% |

For comparison, with the use of the same starting solution described in the process according to J. Biol. Chem., 239 (1964), p. 269, two ammonium sulphate fractionations are carried out and subsequently a chromatography on DEAE-cellulose. In the following, yield and enrichment according this known process are compared with values of the process according to the invention:

| | Yield | Enrichment |
|---|---|---|
| known process (three steps) | 9.5% | 218 fold |
| process according to the invention (one step) | 89% | 204 fold |

Example 2

The process according to the invention can also be carried out in extremely dilute solutions. Thus, an aqueous solution with a content of about 1/100 units of desoxythymidine kinase, which was contaminated by accompanying proteins, was applied, in the above-described manner, to a column of the same volume and eluted as described in Example 1 Table II shows the values of the starting solution of the eluate.

TABLE II

| | ml. | units/ml. | Σ U | protein mg/ml | spec. act. U/mg. |
|---|---|---|---|---|---|
| Fraction III | 50000 | 0.0108(!) | 540 | 3.13 | 0.0035 |
| Eluate (concentrated by ultra-filtration) | 80 | 5.83 | 465 | 6.7 | 0.87 |
| | | | Yield 86% | Enrichment 249 fold | |

The above values shew that the process according to the invention permits the obtaining of thymidine kinase also from extraordinarily diluted solutions in extremely specific manner.

The above process was repeated with the use of cross-linked dextrans which were modified with 3'-amino-thymidine or with N-(ε-amino-hexamethylene)-amino-(5')-thymidine. Comaprable results were hereby obtained.

We claim:

1. A process for recovering purified thymidine kinase, derived from *Escherichia coli*, from an aqueous solution thereof which comprises:
   a. bonding a compound selected from the group consisting of 5'-amino-thymidine, 3'-amino-thymidine, and N-mono-(ω-aminoalkyl) derivatives of said amino-thymidines to a porous carrier, said carrier being a cross-linked polymer or gel insoluble in water;
   b. contacting an aqueous liquid containing said thymidine kinase with said carrier having said compound bonded thereto until said thymidine kinase is adsorbed on said carrier; and
   c. eluting the adsorbed thymidine kinase from said carrier.

2. A process as set forth in claim 1, wherein said carrier is dextran activated by means of cyanobromide, and said aqueous liquid has a pH value between 7 and 8.5.

3. A process as set forth in claim 2, wherein said aqueous solution is purified prior to said contacting by precipitation of impurities by means of streptomycin sulfate.

4. A process as set forth in claim 2, wherein said aqueous liquid contains salts in a concentration of not more than 0.1 M.

5. A process as set forth in claim 2, wherein said adsorbed thymidine kinase is eluted from said carrier by means of a salt solution at least 0.3 molar.

6. A process as set forth in claim 2, wherein said adsorbed thymidine kinase is eluted from said carrier by means of an aqueous sodium chloride solution having a pH value of 7 to 9, and being 0.4 to 1.0 normal with respect to said sodium chloride.

* * * * *